B. BORDEN.
WORK HOLDER FOR PIPE THREADING TOOLS.
APPLICATION FILED JULY 8, 1908.
949,031.
Patented Feb. 15, 1910.
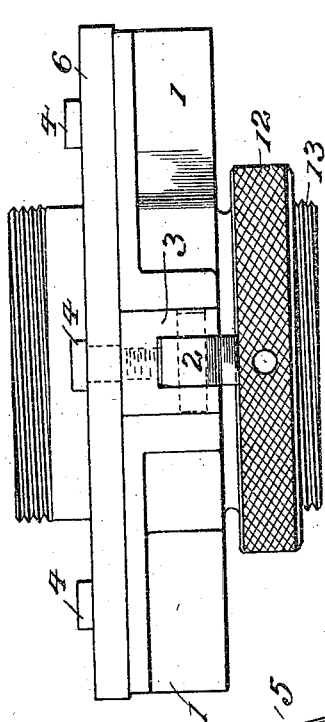
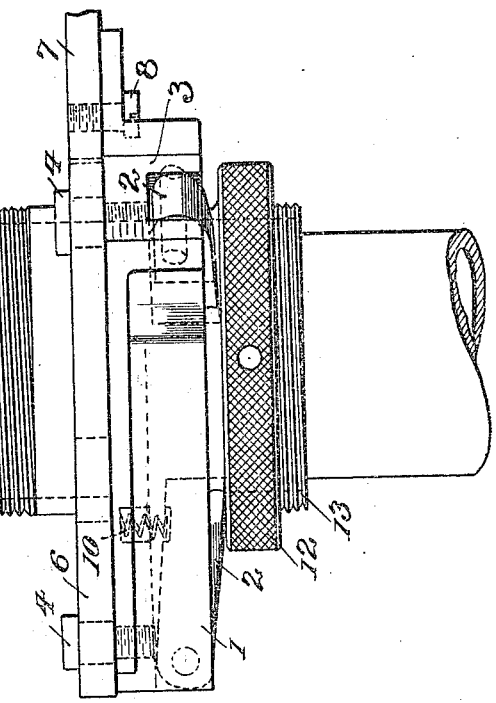
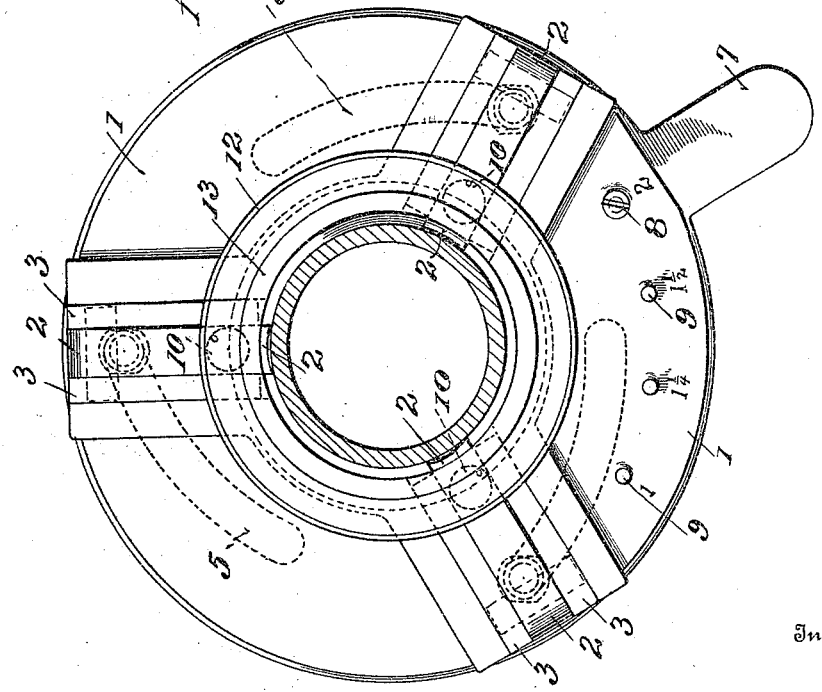
Witnesses
Inventor
Bradford Borden.
By
Attorney

UNITED STATES PATENT OFFICE.

BRADFORD BORDEN, OF WARREN, OHIO, ASSIGNOR TO THE BORDEN COMPANY, OF WARREN, OHIO, A CORPORATION OF OHIO.

WORK-HOLDER FOR PIPE-THREADING TOOLS.

949,031.   Specification of Letters Patent.   Patented Feb. 15, 1910.

Application filed July 8, 1908. Serial No. 442,553.

*To all whom it may concern:*

Be it known that I, BRADFORD BORDEN, of Warren, in the county of Trumbull and State of Ohio, have invented certain new and useful Improvements in Work-Holders for Pipe-Threading Tools; and I do hereby declare the following to be a full, clear, and exact description of the invention, such as will enable others skilled in the art to which it appertains to make and use the same.

The object of this invention is to provide, in a work holder for pipe threading tools, means whereby the device may be readily adjusted to pipes of different sizes and quickly and easily caused to bind thereon.

The invention will be hereinafter fully set forth and particularly pointed out in the claims.

In the accompanying drawings, Figure 1 is a view in side elevation, portions of a threading tool being indicated in dotted lines. Fig. 2 is an end elevation. Fig. 3 is a view at right angles thereto.

Referring to the drawings, 1 designates the work holder housing which, as is well known, forms part of a pipe threading tool, which latter has a movement relative thereto as the cutting operation proceeds. In this housing are formed radial guideways, three being ordinarily sufficient. Within these guideways are pipe-engaging members in the form of jaws 2, each of which is pivotally mounted at its outer end in a carrier block 3 fitted to move in said guideways. From each block projects a stud 4, and these studs take in eccentric slots 5 of a plate 6 rotatable on the hub of the housing, said plate having a handle 7 to permit of its easy manipulation. The rotation of plate 6 will cause the several jaws to move simultaneously toward or away from a common center and thus enable the device to be fitted to pipes of different sizes. The plate 6 is detachably held to housing 1 by a screw 8, and to accommodate the latter the housing has a series of spaced-apart openings 9 marked to indicate the various sizes of pipes for which the jaws may be set by turning and locking the plate.

Each of the pipe-engaging jaws 2 is normally held at an oblique angle relatively to the axis of the work holder. This is effected by coiled springs 10 set in the carrier-blocks and bearing against the jaws near the free ends thereof. In consequence, in order to cause the jaws to firmly bind upon a pipe it is necessary to force them inwardly to as near perpendicular positions relatively to the axis of the device as is possible. For this purpose I mount a collar 12 on the exteriorly threaded hub 13 of the housing. By turning this collar the free ends of the several jaws will be simultaneously engaged and forced inwardly as against the tensions of springs 10.

In practice the several jaws may be quickly and simultaneously adjusted to accommodate pipes of different sizes by merely removing screw 8 and turning plate 6. When so adjusted the jaws will not firmly grip the pipe until they are forced inwardly by collar 12 and caused to occupy a position substantially perpendicular to the axis of the device. In this way the quick change of the jaws to accommodate pipes of different sizes is not delayed by the necessity of securing any nicety of adjutsment, since the jaws being brought approximately into the position desired are then forced into firm engagement with the pipe by the adjustment of the single collar.

I claim as my invention:

1. A threading-tool work-holder comprising a housing, a series of radially-movable jaws mounted in guideways of said housing and normally occupying positions oblique to the axis of the housing, means for simultaneously moving all of the jaws longitudinally of said guideways, and means for simultaneously moving each jaw on a plane parallel to the axis of the housing to force the inner ends of the several jaws toward one another.

2. A threading-tool work-holder comprising a housing, a series of pivoted jaws normally occupying positions oblique to the axis of said housing, means for simultaneously and bodily moving all of the jaws radially toward or away from such axis, and means for turning each jaw on its pivot into a position approximately perpendicular to said axis and on a plane paralleling the plane of the latter.

3. A threading-tool work-holder comprising a housing, a series of radially movable jaws mounted in said housing, means for simultaneously moving all of said jaws toward or away from the axis of the housing, said jaws being pivoted, springs for causing said jaws to normally occupy positions oblique to the axis of the housing, and means for engaging the several jaws to move them on planes parallel to the plane of said axis and into positions approximately perpendicular thereto.

4. The combination with a housing having radial guideways, of a series of jaws, carrier-blocks mounted in said guideways and to which said jaws are pivoted at their outer ends, means for simultaneously moving said jaws inwardly and outwardly, springs tending to hold said jaws in oblique positions, and a collar mounted on the housing for moving said jaws, against the tensions of said springs, on planes parallel to the plane of the axis of the housing.

5. The combination with the housing having a centrally arranged exteriorly threaded hub and radial guideways extending from said hub, of a series of pivoted jaws movable in said guideways, said jaws normally occupying positions oblique to the axis of the housing, and means for simultaneously adjusting said jaws on a plane at right angles to the axis of the housing, springs acting on the jaws to hold them in oblique positions, and a collar on said hub for forcing said jaws into perpendicular positions.

6. The combination with a housing having radial guideways, and carrier-blocks mounted in said guideways, of jaws pivoted in said blocks and having their free ends extended toward the center of the housing, studs projecting from said blocks, a plate having eccentric slots with which said studs engage, means for holding said plate in different positions, and means mounted on the housing for engaging the free ends of said jaws to turn them on their pivots.

7. The combination with a housing having radial guideways, and carrier-blocks mounted in said guideways, of jaws pivoted at their outer ends to said blocks, springs to hold said jaws normally in oblique positions, means for simultaneously moving the carrier-blocks radially, means for locking the latter means to the housing, said housing having an exteriorly threaded hub, and a collar on said hub for engaging and forcing the free ends of said jaws inwardly against the tensions of said springs.

In testimony whereof, I have signed this specification in the presence of two subscribing witnesses.

BRADFORD BORDEN.

Witnesses:
E. WERNER,
R. S. CHILTON, Jr.